United States Patent
Kang (10) Patent No.: US 8,488,058 B2
(45) Date of Patent: Jul. 16, 2013

(54) METHOD FOR SETTING FRAME RATE CONVERSION (FRC) AND DISPLAY APPARATUS USING THE SAME

(75) Inventor: Jeong-woo Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 638 days.

(21) Appl. No.: 12/471,586

(22) Filed: May 26, 2009

(65) Prior Publication Data

US 2010/0091111 A1     Apr. 15, 2010

(30) Foreign Application Priority Data

Oct. 10, 2008    (KR) .................. 10-2008-0099738

(51) Int. Cl.
*H04N 7/01*     (2006.01)

(52) U.S. Cl.
USPC .......... 348/441; 348/445; 348/458; 348/459; 348/563; 348/569; 348/734; 348/447; 348/497; 348/607; 348/625; 725/37; 725/40; 725/43; 725/44; 725/45; 725/46; 725/47

(58) Field of Classification Search
USPC .............. 348/441, 445, 458, 459, 563, 569, 348/734, 447, 497, 607, 625; 725/37, 40, 725/43–47
See application file for complete search history.

(56) References Cited

U.S. PATENT DOCUMENTS

| | | | | |
|---|---|---|---|---|
| 6,567,117 | B1 * | 5/2003 | Nago et al. | 348/180 |
| 2003/0058206 | A1 * | 3/2003 | Lee et al. | 345/87 |
| 2004/0201608 | A1 * | 10/2004 | Ma et al. | 345/719 |
| 2004/0227817 | A1 * | 11/2004 | Oya et al. | 348/155 |
| 2007/0200838 | A1 * | 8/2007 | Lee et al. | 345/204 |
| 2007/0273787 | A1 * | 11/2007 | Ogino et al. | 348/441 |
| 2009/0023482 | A1 * | 1/2009 | Koura et al. | 455/574 |
| 2009/0161011 | A1 * | 6/2009 | Hurwitz et al. | 348/459 |
| 2009/0274379 | A1 * | 11/2009 | Lock et al. | 382/233 |
| 2010/0039557 | A1 * | 2/2010 | Mori et al. | 348/459 |

FOREIGN PATENT DOCUMENTS

JP     08-179269     7/1996

* cited by examiner

*Primary Examiner* — Jason Salce
(74) *Attorney, Agent, or Firm* — Sughrue Mion, PLLC (57) ABSTRACT

A method for setting a frame rate conversion (FRC) and a display apparatus using the same are provided. According to a method for setting FRC, an FRC level is received from a user; and a motion estimation and motion compensation level when performing FRC is set according to the input FRC level. Therefore, a user may set the FRC level according to the user's preference.

28 Claims, 7 Drawing Sheets

METHOD FOR SETTING FRAME RATE CONVERSION (FRC) AND DISPLAY APPARATUS USING THE SAME

CROSS-REFERENCE TO RELATED APPLICATIONS

This application claims priority under 35 U.S.C. §119 from Korean Patent Application No. 10-2008-0099738, filed on Oct. 10, 2008, in the Korean Intellectual Property Office, the disclosure of which is incorporated herein by reference in its entirety.

BACKGROUND OF THE INVENTION

1. Field of the Invention

Apparatuses and methods consistent with the present invention relate to a method for setting frame rate conversion (FRC) and a display apparatus using the same, and more particularly, to a method for setting FRC using motion estimation and motion compensation (ME/MC) and a display apparatus using the same.

2. Description of the Related Art

Recently, 120 Hz Liquid Crystal Display (LCD) Full-High Definition (HD) televisions (TVs) having motion estimation and motion compensation (ME/MC) function to display high quality image without cutoff have been introduced onto the market.

According to the National Television System Committee (NTSC) standard, an image is provided by scanning lines at 30 frames per second or 60 fields per second, and according to the Phase Alternation Line (PAL) or Sequential couleur a memoire (SECAM) standards, an image is provided by scanning lines at 25 frames per second or 50 fields per second. Accordingly, in order to implement an LCD TV having 120 Hz, 100 Hz or 240 Hz, or 200 Hz, a frame rate conversion (FRC) is required.

The FRC represents the function of converting a frame rate of a video to be output through a display. If the frame rate of the video is increased by the FRC, the motion of the video may appear smooth and natural. Therefore, if the FRC technique is used to generate an image of 120 Hz, a higher quality of a motion picture may be achieved.

For the FRC, the frame rate may be increased to a predetermined rate, for example, the frame rate may be increased from 60 Hz to 120 Hz.

The degree of an observed judder or halo may vary according to the frame rate.

Users perceive noise caused by the judder and halo effect differently. Therefore, a method for setting an FRC level according to a user's preference is required.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

The present invention provides a method for setting a frame rate converstion (FRC) level according to a user's preference, by which an FRC level is input by a user and a motion estimation and motion compensation (ME/MC) level is set according to the FRC level input when performing FRC, and a display apparatus using the same.

According to an aspect of the present invention, there is provided a method for setting an FRC which uses ME/MC, including receiving an FRC level input by a user; and setting an ME/MC level when performing FRC according to the input level.

The FRC level may include minimum and maximum values, and may be selected from between the minimum and maximum values at given intervals, and wherein the setting may the ME/MC level include setting the ME/MC level which represents the degree that ME/MC is applied when performing the FRC.

The method may further include displaying a graph on which the FRC level is input and a cursor which is capable of being moved in the graph, wherein the receiving the FRC level comprises receiving an input corresponding to a position of the cursor.

The method may further include displaying a bar graph the ends of which represent the minimum and maximum values of the FRC level and intermediate portions of which represent values between the minimum and maximum values; and displaying a cursor which indicates a currently set FRC level on the bar graph and is capable of being moved using direction keys, wherein the receiving the FRC level may include receiving an input corresponding to a position of the cursor.

The method may further include displaying a numerical value corresponding to the currently set FRC level indicated by the cursor on an area adjacent to the bar graph.

The method may further include displaying a judder intensity icon in which a lower level indicates that a judder effect is more severe.

The method may further include displaying a halo intensity icon in which a higher level represents that a halo effect is more severe.

The method may further include displaying at least one FRC level corresponding to an image genre.

The method may further include storing at least one test image corresponding to an image genre; and playing back a selected test image with the currently set FRC level, if a test image is selected from among the at least one test image.

If the currently set FRC level is changed while the selected test image is being played back, the playing back may include playing back the selected test image with the changed FRC level applied.

According to another aspect of the present invention, there is provided a display apparatus which performs FRC using ME/MC, the display apparatus including an input unit which receives an FRC level input by a user; and a controlling unit which sets an ME/MC level when performing FRC according to the input FRC level.

The level may include minimum and maximum values, and may be selected from between the minimum and maximum values at given intervals, and wherein the controlling unit may set the ME/MC level which represents the degree that ME/MC is applied when performing the FRC.

The display apparatus may further include a display unit which displays a graph on which the FRC level is input and a cursor which is capable of being moved in the graph, wherein the input unit may receive manipulation to move a position of the cursor in order to change the FRC level.

The display apparatus may further include a display unit which displays a bar graph the ends of which represent the minimum and maximum values and intermediate portions of which represent values between the minimum and maximum values, and a cursor which indicates a currently set FRC level on the bar graph and is capable of being moved using direction keys, wherein the input unit may receive manipulation to move the position of the cursor in order to change the FRC level.

The controlling unit may control to display a numerical value corresponding to the FRC level indicated by the cursor on an area adjacent to the bar graph.

The controlling unit may control to display on a screen a judder intensity icon in which a lower level indicates that a judder effect is more severe.

The controlling unit may control to display a halo intensity icon in which a higher level represents that a halo effect is more severe.

The controlling unit may control to display at least one FRC level corresponding to an image genre on a screen.

The display apparatus may further include a storage unit which stores at least one test image corresponding to an image genre; wherein if a test image is selected from among the at least one test image, the controlling unit may control to play back the selected test image with the currently set FRC level.

If the currently set FRC level is changed while the selected test image is being played back, the controlling unit may control to play back the selected test image with the changed FRC level.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS

Certain exemplary embodiments of the present invention will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

Figure 1:
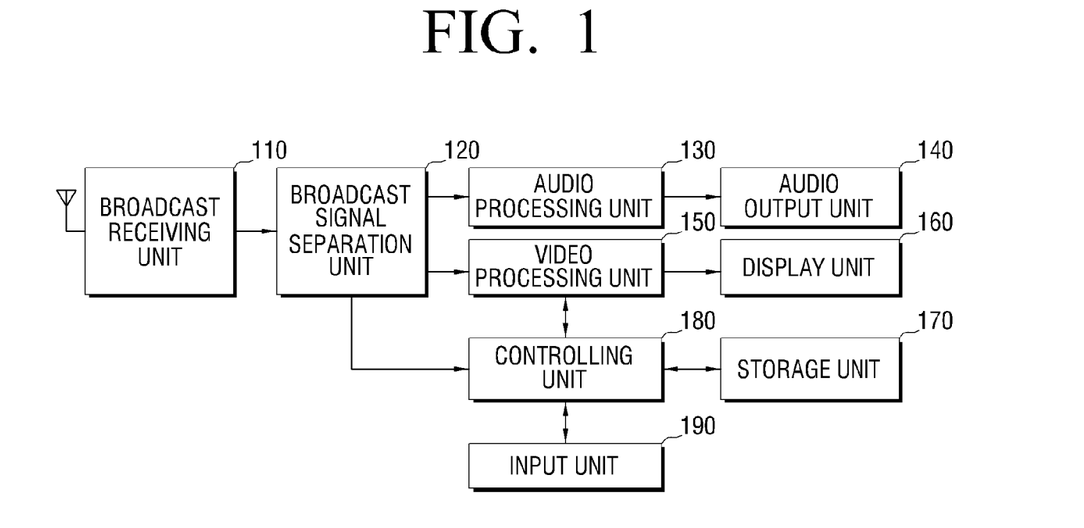
FIG. 1 is a block diagram illustrating a television (TV) according to an exemplary embodiment of the present invention.

FIG. 1 is a block diagram illustrating a television (TV) according to an exemplary embodiment of the present invention. Referring to FIG. 1, the TV includes a broadcast receiving unit 110, a broadcast signal separation unit 120, an audio processing unit 130, an audio output unit 140, a video processing unit 150, a display unit 160, a storage unit 170, a controlling unit 180, and an input unit 190 that receives a command input from a user.

The broadcast receiving unit 110 receives broadcasts wiredly or wirelessly, tunes to one of the received broadcasts, and demodulates the tuned broadcast.

The broadcast signal separation unit 120 separates a broadcast signal received from the broadcast receiving unit 110 into an audio signal, a video signal, and additional data, and outputs the separated signals. The audio signal and video signal separated from the broadcast signal are transmitted to the audio processing unit 130 and the video processing unit 150, respectively. The additional data are transmitted to the controlling unit 190. The additional data may include Program and System Information Protocol (PSIP) information.

The audio processing unit 130 decodes an audio signal output from the broadcast signal separation unit 120. The audio processing unit 130 converts the decoded audio signal into an audio signal which is capable of being output through a speaker provided on a TV.

The audio output unit 140 outputs the audio signal output from the audio processing unit 130 through the speaker.

The video processing unit 150 processes a video signal output from the broadcast signal separation unit 120 by performing video decoding and/or video scaling. The video processing unit 150 will be explained in detail with reference to FIG. 2.

Figure 2:
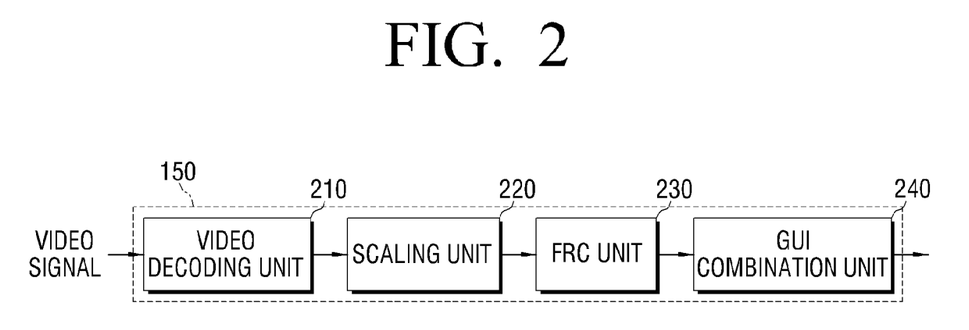
FIG. 2 is a detailed block diagram illustrating a video processing unit according to an exemplary embodiment of the present invention.

FIG. 2 is a detailed block diagram illustrating the video processing unit 150 of FIG. 1 according to an exemplary embodiment of the present invention. Referring to FIG. 2, the video processing unit 150 includes a video decoding unit 210, a scaling unit 220, a frame rate conversion (FRC) unit 230, and a graphical user interface (GUI) combination unit 240.

The video decoding unit 210 decodes a video signal output by the broadcast separation unit 120, and accordingly the video decoding unit 210 outputs a decompressed video signal.

The scaling unit 220 scales the video of the video signal output from the video decoding unit 210 so that the video fits on a display of a TV.

The FRC unit 230 performs FRC on the video scaled by the scaling unit 220. For example, if the frame rate of the video transmitted by the scaling unit 220 is 60 Hz, the FRC unit 230 may convert the frame rate of the video into 120 Hz. The reason that the frame rate of the video is increased is to provide a user with a video having a smooth and natural motion.

If the FRC unit 230 increases the frame rate of an input video, the FRC unit 230 generates a new frame. For example, if it is desired to increase the frame rate of a video from 60 Hz to 120 Hz, the FRC unit 230 adds a single new frame for each existing frame. Accordingly, the FRC unit 230 converts an input video having 60 frames per second to a video having 120 frames per second, and outputs the converted video.

Motion estimation and motion compensation (ME/MC) may be applied to generate frames to be newly inserted. If the ME/MC is applied, the FRC unit 230 estimates the motion of a frame with reference to a previous frame and a subsequent frame, generates a compensated frame, and inserts the compensated frame. If the ME/MC is applied for FRC, the video of which the frame rate has been converted may be displayed with a more smooth motion.

However, if the ME/MC is applied to generate a frame to be newly inserted, a halo effect may occur on a video. The halo refers to an incidental image.

In order to avoid the halo effect, the FRC unit 230 may generate a frame to be newly inserted which has the same image as the previous frame. Such a frame having the same image as that of the previous frame is referred to as a pullback frame. If a large number of pullback frames are used when performing FRC, a judder effect may occur in a video of sports, movies, or games having fast-moving motions. Here, the judder means that a video does not appear to be displayed evenly.

If a frame rate is increased, whether a judder or halo effect occurs on an image is determined according to whether a frame to which ME/MC is applied is inserted or a pullback frame is inserted. The more judder effect occurs, the less halo effect occurs, and also the more halo effect occurs, the less judder effect occurs. That is, the occurrence of the judder effect is in inverse proportion to the occurrence of the halo effect.

According to an ME/MC level to be discussed later, the FRC unit 230 determines whether more ME/MC frames which are generated from ME/MC are inserted or more pullback frames are inserted. Specifically, the FRC unit 230 raises the ratio of pullback frames to ME/MC frames to be inserted if the ME/MC level is low, and the FRC unit 230 raises the ratio of ME/MC frames to pullback frames to be inserted if the ME/MC level is high.

When performing FRC, the FRC unit 230 determines an ME/MC level according to an FRC level set by a user. The ME/MC level represents the degree that ME/MC is applied, that is, the higher the ME/MC level is, the more ME/MC frames which are generated from ME/MC are inserted. The FRC level set by the user is a numeral value input by the user and corresponds to the ME/MC level when performing FRC. The FRC level has predetermined maximum and minimum values, and a user may select an FRC level at a given interval between the maximum value and the minimum value.

The FRC unit 230 raises the frame rate at regular frequency intervals, for example, the FRC unit 230 may raise the frame rate from 60 Hz to 120 Hz, and adjusts the ME/MC level in order to reduce the judder or halo effect occurring when an image is displayed. Accordingly, a high quality image may be displayed.

The GUI combination unit 240 generates a GUI to be displayed on the display under the control of the controlling unit 180. The GUI generated by the GUI combination unit 240 is a type of display information to be displayed on the display so that a user interfaces with the TV The GUI may include not only a means for receiving a user command such as a menu screen but also a means for informing the operating condition of the TV.

The GUI combination unit 240 adds a generated GUI to a video on which FRC is performed by the FRC unit 230.

The display unit 160 displays a video output from the video processing unit 150. Specifically, the display unit 160 displays a graph to input an FRC level and a cursor which is able to be moved along the graph. The graph represents a GUI to select a specific value between the minimum value and the maximum value of the FRC level. For example, the graph may be a bar graph, a pie chart, or a sphere chart.

For example, the display unit 160 may display a bar graph which is divided into portions representing minimum, intermediate, and maximum values, and a cursor which indicates a current FRC level on the bar graph and is able to be moved using direction keys.

The storage unit 170 records a broadcast signal received from the broadcast receiving unit 110 and stores the received broadcast signal. The storage unit 170 stores a setting value regarding FRC set by a user. The setting value regarding FRC may include an FRC level input by a user corresponding to an ME/MC level, and an FRC level for each genre of broadcasts. The controlling unit 170 stores at least one test image corresponding to the genre of an image. The test image represents an image provided to test a screen variation according to an FRC level input by a user. The test image may be a moving picture.

The input unit 190 transmits a command input by a user to the controlling unit 180. The input unit 190 may include an input means provided on a front panel of the TV and/or a means for receiving a user command input through a remote controller.

The controlling unit 180 controls overall operations of the TV according to a user command input through the input unit 190.

Specifically, the controlling unit 180 sets the ME/MC level when performing FRC according to the FRC level input through the input unit 190. The FRC level may be a numerical value input by a user, and may correspond to the ME/MC level when performing FRC. The FRC level has predetermined minimum and maximum values, and may be selected by a user from between the minimum value and the maximum value. The ME/MC level represents the degree to which ME/MC is applied when performing FRC.

An input FRC level may be a value in a continuous numeral range, and a user may set an FRC level according to the user's preference.

The controlling unit 180 controls the screen to display a bar graph which shows the minimum and maximum values and intermediate portions indicating values between the minimum and maximum values. The controlling unit 180 causes the cursor to be displayed on the screen. The cursor indicates the currently set FRC level and is moved by the direction of the input unit 190 on the bar graph. If a manipulation for moving a cursor is input, the controlling unit 180 moves the cursor in order to change the FRC level.

As the FRC level is determined by moving the cursor displayed on the bar graph, a user may select any FRC level along a continuous scale and thus may more precisely adjust the FRC level.

The controlling unit 180 causes the FRC level indicated by the cursor to be displayed on an area adjacent to the bar graph as a numerical value. Accordingly, a user may easily recognize the currently set FRC level.

The controlling unit 180 causes a judder intensity icon and a halo intensity icon to be displayed on the display. A user may estimate the degree of the judder and halo effects according to the FRC level shown by the bar graph for the judder and halo effects. An exemplary embodiment of displaying the judder and halo effects will be explained in detail with reference to FIG. 5.

The controlling unit 180 controls to display at least one FRC level corresponding to the genre of an image displayed on the screen. For example, if a user selects a menu for adjusting a function of FRC, the controlling unit 180 displays a recommended FRC level for the genre of an image displayed on the screen. Accordingly, a user may easily check an appropriate FRC level for each image genre.

The controlling unit 180 extracts information regarding the genre of a currently broadcasted program from electronic program guide (EPG) information received through the broadcast receiving unit 110, and sets the function of FRC to an FRC level corresponding to the extracted information. If the controlling unit 180 automatically sets the function of the FRC using the EPG information, a user may view the broadcast program with an optimum frame rate for the genre of the currently broadcasted program without performing additional manipulation.

If a test image is selected from the test images stored in the storage unit 170, the controlling unit 180 causes the test image to be played back with the currently set FRC level. If the FRC level is changed while the selected test image is played back, the controlling unit 180 applies the changed FRC level to the selected test image and plays back the selected test image with the changed FRC level.

The test image means an image to which an FRC level set with reference the FRC is applied so that a user may view the image with the set FRC level. Test images are stored for each genre in the storage unit 170. For example, the storage unit 170 may store a sport test image, a drama test image, a movie test image, a news program test image, and so on.

When the FRC level is changed while the test image is being played back, a user may recognize how the judder and halo effects occur on the screen according to the change of an FRC level. A user may determine an FRC level to fit the user's preference by playing back the test image.

The structure and function of the TV are described in detail with reference to FIGS. 1 and 2. Hereinbelow, a method for setting FRC will be explained with reference to FIGS. 3 to 7.

Figure 3:
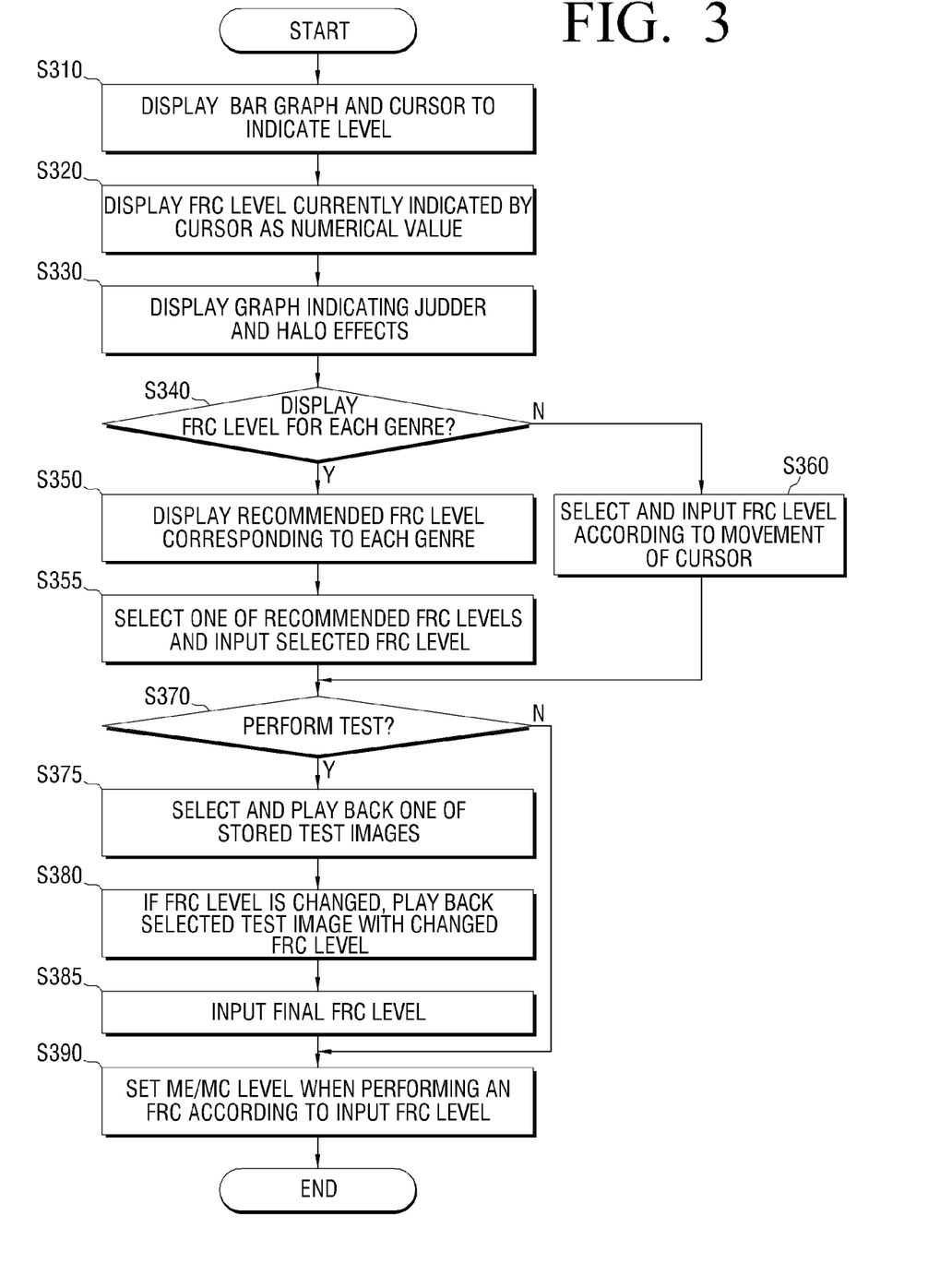
FIG. 3 is a flowchart provided to explain a method for setting a frame rate conversion (FRC) according to an exemplary embodiment of the present invention.

FIG. 3 is a flowchart provided to explain a method for setting FRC according to an exemplary embodiment of the present invention.

If a user selects a menu for setting an FRC function, the TV displays a bar graph and a cursor on the bar graph to indicate an FRC level corresponding to an ME/MC level on the screen ($S_{310}$). Specifically, the TV displays on the screen the bar graph which shows minimum and maximum values and intermediate portions indicating values between the minimum and maximum values. The TV controls a cursor which indicates the currently set FRC level on the bar graph and is moved by the direction of the input unit 190 to be displayed on the screen. A user may adjust the FRC level by moving the cursor using direction keys provided on a front panel of the TV or a remote controller.

While a bar graph is used as a graph to input an FRC level in this exemplary embodiment of the present invention, any graph to input an FRC level may be used. That is, the graph displayed by the TV for inputting an FRC level and a cursor capable of moving along the graph may be a bar graph, pie chart, or a sphere chart.

The TV displays an FRC level currently indicated by a cursor as a numerical value on an area adjacent to the bar graph ($S_{320}$). A user may easily check the currently set FRC level by viewing the numerical value.

Figure 4:
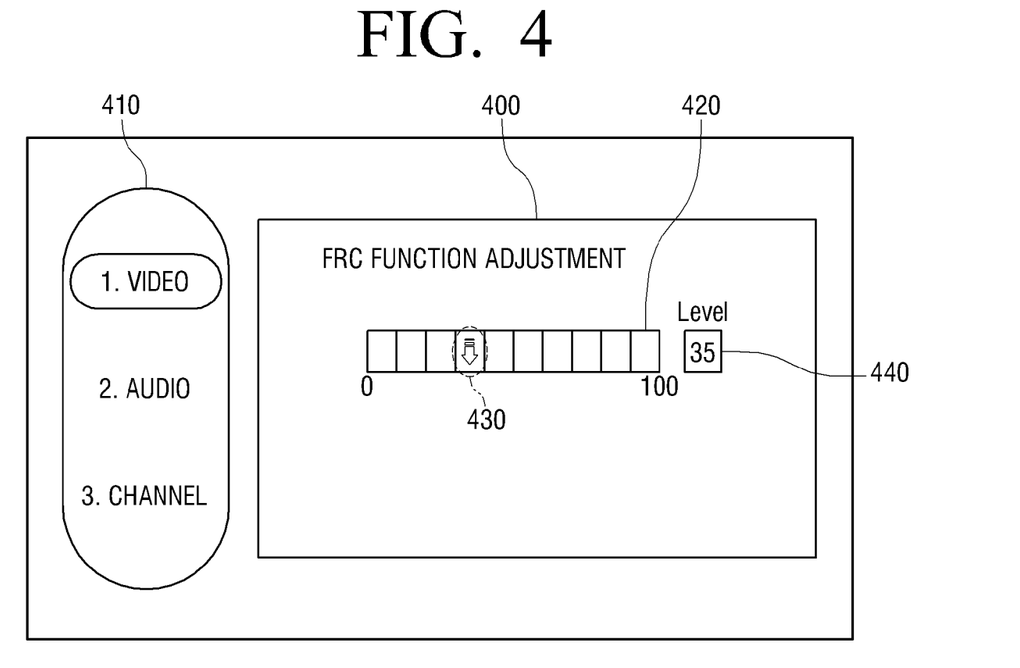
FIG. 4 is a view illustrating a screen for setting the FRC using a bar graphic, according to an exemplary embodiment of the present invention.

The screen for adjusting an FRC level using a bar graph or a cursor will be explained in detail with reference to FIG. 4. FIG. 4 is a view illustrating a screen for setting FRC using a bar graph, according to an exemplary embodiment of the present invention.

Referring to FIG. 4, the screen includes thereon a main menu 410 and an adjusting menu 400 to adjust a function of FRC. The first item "video" is selected in the main menu 410.

The adjusting menu 400 includes a bar graph 420, a cursor 430, and a numerical level 440. The leftmost end of the bar graph 420 indicates the minimum level, and the rightmost end of the bar graph 420 indicates the maximum level. The cursor 430 indicates a portion corresponding to a currently selected FRC level, and the numerical level 440 represents the FRC level indicated by the cursor 430 as a numerical value.

A user may adjust the FRC level by moving the cursor 430 positioned on the bar graphic 420, and may select any value along a continuous scale. Accordingly, the level of FRC may be precisely set.

The TV then displays a graph indicating the judder and halo effects (S330). For example, the TV displays on the screen a judder intensity icon, in which the lower an FRC level is, the more severe the judder effect is, and the higher an FRC level is, the more severe the halo effect is.

Figure 5:
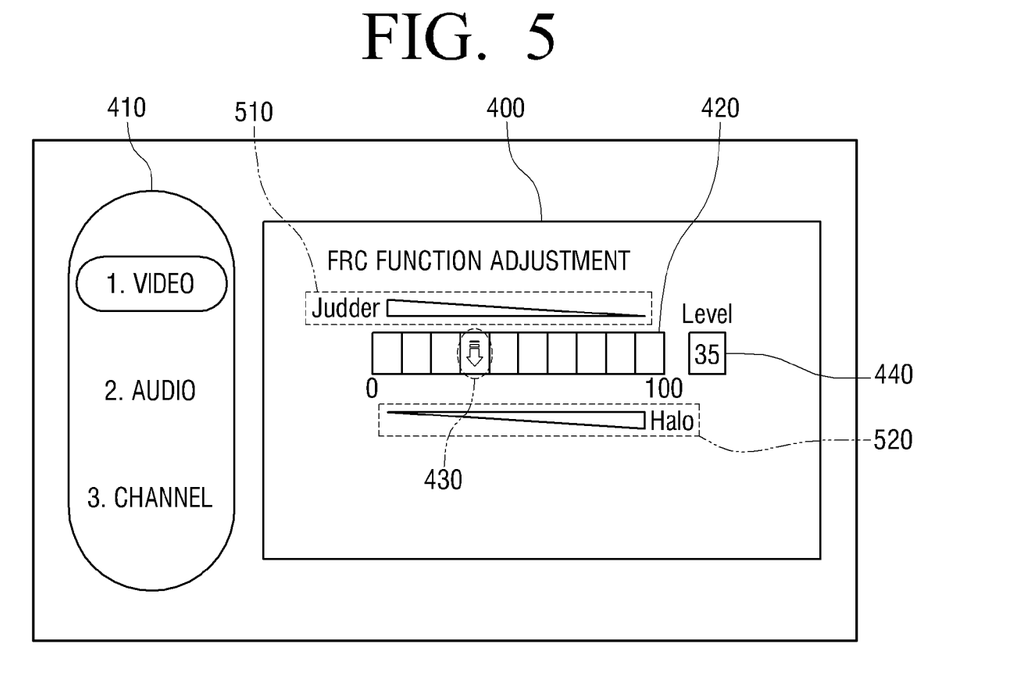
FIG. 5 is a view illustrating a screen for setting the FRC using a judder intensity icon and a halo intensity icon according to an exemplary embodiment of the present invention.

Hereinbelow, the screen including the judder intensity icon and the halo intensity icon will be explained in detail with reference to FIG. 5. FIG. 5 is a view illustrating a screen for setting FRC using a judder intensity icon and a halo intensity icon according to an exemplary embodiment of the present invention.

Explanations common to FIGS. 4 and 5 are not provided in detail. The screen of FIG. 5 further includes a judder intensity icon 510 and a halo intensity icon 520 within the adjusting menu 400 to adjust FRC. The lower is the FRC level indicated by the judder intensity icon 510, the more severe is the judder effect, and the higher is an FRC level indicated by the halo intensity icon 520, the more severe is the halo effect.

The judder intensity and halo intensity are represented along with a bar graph, and thus a user may easily estimate the degree of the judder and halo effects according to the FRC levels shown. It is difficult for a user to know the effects that would occur when the FRC level is changed. However, the user may easily see the effects occurring according to the adjustment of the FRC level by viewing the judder and halo intensity icons 510 and 520.

Returning to FIG. 3, the TV determines whether a user inputs a command for displaying an FRC level for each genre (S340). If the command for displaying an FRC level for each genre is not input (S340-N), the TV selects and inputs the FRC level according to the movement of the cursor (S360).

If a command for displaying an FRC level for each genre is input (S340-Y), the TV displays a recommended FRC level corresponding to each genre of an image displayed on the screen (S350). The user selects one of the recommended FRC levels displayed on the screen and inputs the selected FRC level (S355).

Figure 6:
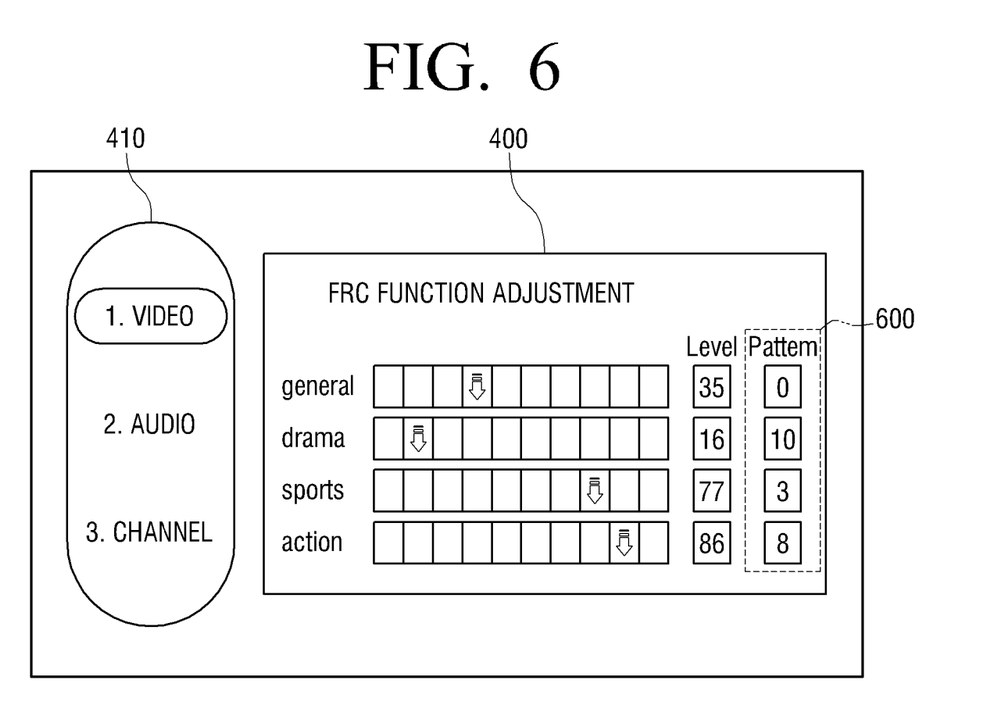
FIG. 6 is a view illustrating a screen for setting the FRC in which a recommended level and the number of test images for each genre are displayed, according to an exemplary embodiment of the present invention.

Hereinbelow, the screen displaying an FRC level for each genre thereon will be explained with reference to FIG. 6. FIG. 6 is a view illustrating a screen for setting FRC in which a recommended FRC level and an identification number of the test image for each genre are displayed, according to an exemplary embodiment of the present invention.

FIG. 6 illustrates a screen showing the case in which a user inputs a command for displaying an FRC level for each genre. Referring to FIG. 6, a plurality of bar graphs are displayed within the adjusting menu 400. The respective FRC levels are displayed on the right-hand portion of each of the bar graphs.

In FIG. 6, four bar graphs are displayed, and recommend FRC levels for "general," "drama," "sports," and "action," respectively, are displayed using cursors and numerical values. The TV may display the recommend FRC levels for various genres.

A pattern 600 is added to the adjusting menu 400. The pattern 600 represents a pattern number of a test image for each genre. For example, the drama image has a recommended FRC level of 16, and a test image 10. Accordingly, if a user desires to view a drama, the user may play back the test image 10 having an FRC level of 16 in order to test the FRC level of an FRC function.

Returning to FIG. 3, the TV determines whether a command for performing a test is input (S370). If the command for performing a test is not input (S370-N), the TV may set an ME/MC level when FRC is performed according to the currently input FRC level (S390). That is, the TV sets an ME/MC level according to the currently input FRC level.

On the other hand, if the command for performing a test is input (S370-Y), the TV selects an image selected by a user from the stored test images, and plays back the selected image (S375). That is, the TV plays back the selected test image with a currently set FRC level.

If a user changes the FRC level while the selected test image is being played back, the TV applies the changed FRC level to the selected test image and plays back the selected test image with the changed FRC level (S380). The TV performs the test operations and receives a final FRC level (S385). An ME/MC level when performing FRC is set according to the input FRC level (S390).

Figure 7:
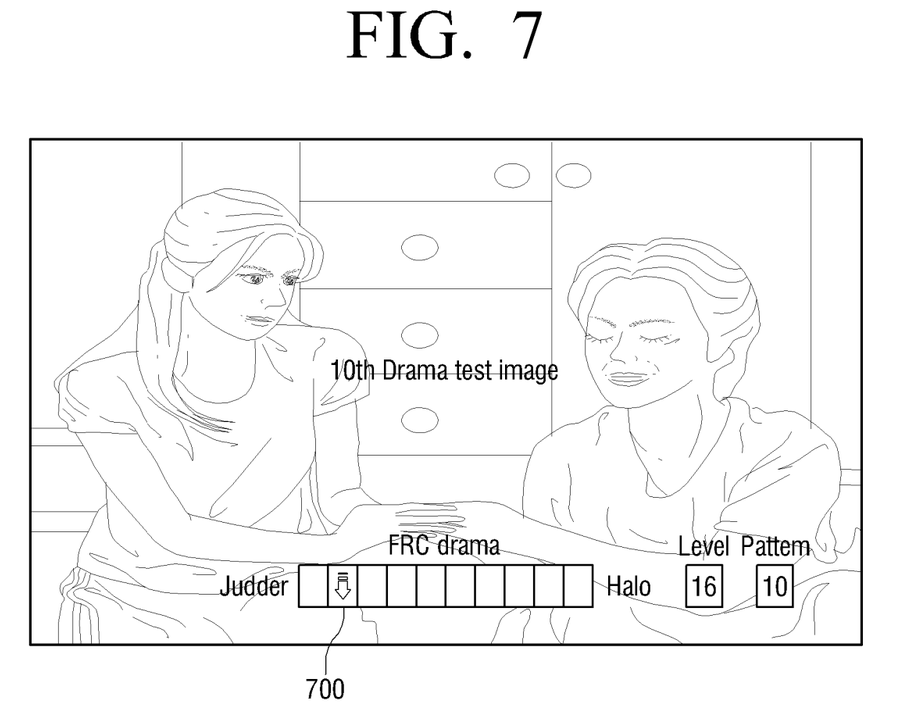
FIG. 7 is a view illustrating a screen for adjusting a level while a user is viewing a test image, according to an exemplary embodiment of the present invention.

Hereinbelow, the screen on which an FRC level is adjusted and concurrently a test image is played back will be explained in detail with reference to FIG. 7. FIG. 7 is a view illustrating a screen for adjusting an FRC level while a user is viewing a test image, according to an exemplary embodiment of the present invention.

In FIG. 7, a bar graph 700 to adjust an FRC level is displayed on the screen on which a drama test image is played back. As shown in FIG. 7, the pattern 10 corresponds a drama test image, and the FRC level is currently set to 16. "Judder" is displayed on a left-hand portion of the bar graph 700 and thus a user may see that if the FRC level is low, the judder effect is severe. Furthermore, "halo" is also displayed on a right-hand portion of the bar graph 70 and thus a user may see that if the FRC level is high, the halo effect is severe.

A user may input a desired FRC level by moving a cursor using direction keys on the input unit 190, and directly view the screen to which the input FRC level is applied. Accordingly, a user may easily adjust the FRC function.

As the FRC level is changed while the test image is being played back, a user may see how the judder and halo effects occur on the test image according to the change of an FRC level. The user may easily determine an appropriate FRC level while playing back the test image.

A method for setting FRC is described with reference to FIGS. 3 to 7.

While the TV is provided as a display apparatus in this exemplary embodiment of the present invention, this is merely an exemplary embodiment of the preset invention. The present invention may be applied to any display apparatus which employs the FRC technology in addition to a TV For example, the display apparatus may be a monitor, a mobile phone, a navigator, or a personal multimedia player (PMP).

According to various exemplary embodiments of the present invention, there are provided a method for setting FRC in which an FRC level is input by a user and an ME/MC level when performing FRC is set according to the input FRC level, and a display apparatus using the same. Accordingly, a user may set a level of FRC according to the user's preference.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method of frame rate conversion (FRC) which uses motion estimation and motion compensation (ME/MC), the method comprising:
   receiving an FRC level input by a user;
   setting an ME/MC level according to the FRC level; and
   performing FRC based on the ME/MC level,
   wherein the user input of the FRC level comprises setting, by the user, a proportion of judder intensity to a halo intensity.

2. The method as claimed in claim 1, wherein the FRC level comprises minimum and maximum values, and is selected from between the minimum and maximum values at given intervals, and
   wherein the ME/MC level represents a degree that ME/MC is applied when performing the FRC.

3. The method as claimed in claim 1, further comprising:
   displaying a graph on which the FRC level is input and a cursor which is capable of being moved in the graph to change the FRC level,
   wherein the receiving the FRC level comprises receiving an input corresponding to a position of the cursor.

4. The method as claimed in claim 1, further comprising:
   displaying a bar graph which shows minimum and maximum values of the FRC level and intermediate portions representing values between the minimum and maximum values of the FRC level; and
   displaying a cursor which indicates a currently set FRC level on the bar graph and is capable of being moved in the graph by an input by the user,
   wherein the receiving the FRC level comprises receiving an input corresponding to a position of the cursor.

5. The method as claimed in claim 4, further comprising:
   displaying a numerical value corresponding to the currently set FRC level indicated by the cursor on an area adjacent to the bar graph.

6. The method as claimed in claim 1, further comprising:
   displaying at least one FRC level corresponding to an image genre.

7. The method as claimed in claim 1, further comprising:
   storing at least one test image corresponding to an image genre;
selecting a test image among the at least one test image; and
   playing back a selected test image with a currently set FRC level.

8. The method as claimed in claim 7, wherein if the currently set FRC level is changed while the selected test image is being played back, the playing back comprises playing back the selected test image with the changed FRC level applied.

9. The method of claim 1, wherein the FRC level input by the user comprises amount by which to increase frame rate of a video.

10. The method of claim 1, wherein the FRC level input by the user comprises amount by which to increase frame rate from original frame rate of a video.

11. The method of claim 1, wherein the receiving the FRC level comprises receiving user input of the FRC level for each genre of a program so as to increase frame rate of a video based on the genre.

12. A method of frame rate conversion (FRC) which uses motion estimation and motion compensation (ME/MC), the method comprising:
   displaying a judder intensity icon in which a lower level indicates that a judder effect is more severe;
   receiving an FRC level input by a user;
   setting an ME/MC level according to the FRC level; and
   performing FRC based on the ME/MC level.

13. A method of frame rate conversion (FRC) which uses motion estimation and motion compensation (ME/MC), the method comprising:
  displaying a halo intensity icon in which a higher level represents that a halo effect is more severe;
  receiving an FRC level input by a user;
  setting an ME/MC level according to the FRC level; and
  performing FRC based on the ME/MC level.

14. A display apparatus which performs a frame rate conversion (FRC) using motion estimation and motion compensation (ME/MC), the display apparatus comprising:
  an input unit which receives an FRC level input by a user; and
  a controlling unit which sets an ME/MC level according to the FRC level, and performs FRC based on the ME/MC level,
  wherein the user input of the FRC level comprises setting, by the user, a proportion of a judder intensity to a halo intensity.

15. The display apparatus as claimed in claim 14, wherein the FRC level comprises minimum and maximum values, and is selected from between the minimum and maximum values at given intervals, and
  wherein the ME/MC level represents a degree that ME/MC is applied when performing the FRC.

16. The display apparatus as claimed in claim 14, further comprising:
  a display unit which displays a graph on which the FRC level is input and a cursor which is capable of being moved in the graph to change the FRC level,
  wherein the input unit receives manipulation to move a position of the cursor in order to change the FRC level.

17. The display apparatus as claimed in claim 14, further comprising:
  a display unit which displays a bar graph which shows minimum and maximum values of the FRC level and intermediate portions representing values between the minimum and maximum values of the FRC level, and a cursor which indicates a currently set FRC level on the bar graph and is capable of being moved in the graph by an input by the user,
  wherein the input unit receives manipulation to move a position of the cursor in order to change the FRC level.

18. The display apparatus as claimed in claim 17, wherein the controlling unit controls to display a numerical value corresponding to the FRC level indicated by the cursor on an area adjacent to the bar graph.

19. The display apparatus as claimed in claim 17, wherein the controlling unit controls to display at least one FRC level corresponding to an image genre on a screen.

20. The display apparatus as claimed in claim 14, further comprising:
  a storage unit which stores at least one test image corresponding to an image genre;
  wherein the controlling unit selects a test image among the at least one test image, and controls to play back the selected test image with a currently set FRC level.

21. The display apparatus as claimed in claim 20, wherein if the currently set FRC level is changed while the selected test image is being played back, the controlling unit controls to play back the selected test image with the changed FRC level.

22. A display apparatus which performs a frame rate conversion (FRC) using motion estimation and motion compensation (ME/MC), the display apparatus comprising:
  an input unit which receives an FRC level input by a user; and
  a controlling unit which sets an ME/MC level according to the FRC level, and performs FRC based on the ME/MC level,
  wherein the controlling unit controls to display on a screen a judder intensity icon in which a lower level indicates that a judder effect is more severe.

23. A display apparatus which performs a frame rate conversion (FRC) using motion estimation and motion compensation (ME/MC), the display apparatus comprising:
  an input unit which receives an FRC level input by a user; and
  a controlling unit which sets an ME/MC level according to the FRC level, and performs FRC based on the ME/MC level,
  wherein the controlling unit controls to display a halo intensity icon in which a higher level represents that a halo effect is more severe.

24. A display apparatus that performs a frame rate conversion (FRC), the display apparatus comprising:
  a receiving unit that receives a program;
  a storing unit that stores FRC levels corresponding to respective genres of programs;
  a display unit that displays a program;
  a controlling unit that determines an FRC level among the FRC levels corresponding to a genre of the program, and controls the display unit to display the program based on the determined FRC level; and
  an input unit which receives user input comprising the FRC levels corresponding to the respective genres stored in the storing unit,
  wherein the FRC level comprises increasing frame ratio.

25. The display apparatus of claim 24, wherein if another program having a different genre of the respective genres of the programs is selected to be displayed on the display unit by a user, the controlling unit changes the FRC level to another FRC level corresponding to the different genre.

26. The display apparatus of claim 24, wherein the controlling unit controls to display the FRC levels on the display unit to allow a user changes the FRC levels.

27. The display apparatus of claim 24, wherein the storing unit further stores electronic program guide (EPG) information for the program,
  and wherein the controlling unit determines the FRC level according to the EPG information.

28. A display apparatus that performs a frame rate conversion (FRC), the display apparatus comprising:
  a receiving unit that receives a program;
  a storing unit that stores FRC levels corresponding to respective genres of programs;
  a display unit that displays a program;
  a controlling unit that determines an FRC level among the FRC levels corresponding to a genre of the program, and controls the display unit to display the program based on the determined FRC level,
  wherein the FRC level comprises increasing frame ratio,
  wherein the controlling unit controls display of the FRC levels on the display unit to allow a user to change the FRC levels, and
  wherein the storing unit further stores at least one test image for each of the respective genres and wherein a display apparatus displays one of the at least one test image with the displayed FRC levels such that the FRC levels are manipulated by the user on the display and applied to the displayed one test image.

* * * * *